(12) United States Patent
Numa

(10) Patent No.: US 8,936,128 B2
(45) Date of Patent: Jan. 20, 2015

(54) ENGINE ROOM OF A WHEEL LOADER

(71) Applicant: Komatsu Ltd., Tokyo (JP)

(72) Inventor: Yasutaka Numa, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/009,372

(22) PCT Filed: Feb. 22, 2013

(86) PCT No.: PCT/JP2013/054464
§ 371 (c)(1),
(2) Date: Oct. 2, 2013

(87) PCT Pub. No.: WO2014/128911
PCT Pub. Date: Aug. 28, 2014

(65) Prior Publication Data
US 2014/0238767 A1    Aug. 28, 2014

(51) Int. Cl.
*B60K 11/08* (2006.01)
*B60K 13/04* (2006.01)
*B60K 11/02* (2006.01)

(52) U.S. Cl.
CPC ................. *B60K 13/04* (2013.01); *B60K 11/02* (2013.01)
USPC ....................................... 180/69.25; 180/309

(58) Field of Classification Search
CPC ..... B60K 11/04; B60K 11/08; F01P 2001/05; F01P 11/10; E02F 9/0866
USPC .......... 180/309, 68.1, 68.3, 68.4, 69.2, 69.25, 180/296; 296/100.09, 193.09, 193.1; 123/41.01, 41.65, 41.71; 165/41, 51, 165/122
See application file for complete search history.

(56) References Cited

U.S. PATENT DOCUMENTS

| 1,232,550 A | * | 7/1917 | Huff ........................... 180/69.25 |
| 1,347,218 A | * | 7/1920 | Fassel ........................ 180/69.25 |

(Continued)

FOREIGN PATENT DOCUMENTS

| EP | 0 734 898 A2 | 3/1996 |
| JP | 8-276755 A | 10/1996 |

(Continued)

OTHER PUBLICATIONS

The extended European search report for the corresponding European application No. 13745330.4, issued on Feb. 24, 2014.

(Continued)

*Primary Examiner* — Brodie Follman
(74) *Attorney, Agent, or Firm* — Global IP Counselors, LLP

(57) ABSTRACT

A wheel loader comprises an engine, an exhaust gas post-processing device, an engine room, a top plate, a cooling room, a partition wall, and a drainage mechanism. The exhaust gas post-processing device is disposed above the engine in the engine room and includes a diesel particulate filtering device and a selective catalyst reduction catalyst device. The top plate has a sloping part with a height that decreases toward the rear, and a first ventilation part that includes a plurality of through-holes formed in the sloping part. The top plate defines an upper plane of the engine room. The cooling room accommodates a cooling unit and is disposed to the rear of the engine room, separated by the partition wall. The drainage mechanism is disposed below the first ventilation part, and configured to drain water entering the engine room from the first ventilation part to the outside of the engine room.

11 Claims, 9 Drawing Sheets

(56) References Cited

U.S. PATENT DOCUMENTS

| | | | |
|---|---|---|---|
| 1,605,122 A * | 11/1926 | Lucas | 180/69.25 |
| 1,612,706 A * | 12/1926 | De Vries | 180/69.25 |
| 1,638,479 A * | 8/1927 | Farr | 180/69.25 |
| 1,855,038 A * | 4/1932 | Walker | 180/68.3 |
| 2,175,528 A * | 10/1939 | Klavik | 180/68.1 |
| 2,300,010 A * | 10/1942 | Rose | 237/8 A |
| 2,300,011 A * | 10/1942 | Rose | 237/8 A |
| 2,619,160 A * | 11/1952 | Korshak | 431/162 |
| 3,358,787 A * | 12/1967 | Bangasser et al. | 180/69.2 |
| 3,762,489 A * | 10/1973 | Proksch et al. | 180/68.1 |
| 3,910,041 A * | 10/1975 | Gibson | 60/280 |
| 3,982,600 A * | 9/1976 | Gerresheim et al. | 180/69.21 |
| 4,133,547 A * | 1/1979 | Fox | 180/68.3 |
| 4,137,983 A * | 2/1979 | Gray | 180/69.24 |
| 4,341,277 A * | 7/1982 | Adamson et al. | 180/68.1 |
| 4,354,458 A * | 10/1982 | Bury | 123/184.38 |
| 4,562,895 A * | 1/1986 | Kirchweger | 180/68.1 |
| 4,604,974 A * | 8/1986 | Watanabe | 123/41.57 |
| 4,606,422 A * | 8/1986 | Jewett | 180/68.1 |
| 4,646,864 A * | 3/1987 | Racchi | 180/69.22 |
| 4,850,444 A * | 7/1989 | Bojanowski et al. | 180/68.1 |
| 4,862,981 A * | 9/1989 | Fujikawa et al. | 180/68.4 |
| 5,018,661 A * | 5/1991 | Cyb | 228/176 |
| 5,022,479 A * | 6/1991 | Kiser et al. | 180/68.3 |
| 5,590,624 A | 1/1997 | Emond et al. | |
| 5,645,134 A * | 7/1997 | Frankel et al. | 180/69.24 |
| 5,678,648 A * | 10/1997 | Imanishi et al. | 180/68.1 |
| 5,950,753 A * | 9/1999 | Muldoon et al. | 180/68.1 |
| 6,167,976 B1 * | 1/2001 | O'Neill et al. | 180/69.2 |
| 6,408,969 B1 * | 6/2002 | Lobert et al. | 180/68.1 |
| 6,435,144 B1 * | 8/2002 | Dicke et al. | 123/41.12 |
| 6,435,264 B1 * | 8/2002 | Konno et al. | 165/41 |
| 6,454,527 B2 * | 9/2002 | Nishiyama et al. | 415/119 |
| 6,655,486 B2 * | 12/2003 | Oshikawa et al. | 180/68.1 |
| 6,745,860 B2 * | 6/2004 | Yabe | 180/68.1 |
| 6,874,998 B2 * | 4/2005 | Roby | 417/407 |
| 6,901,890 B2 * | 6/2005 | Sato | 123/41.31 |
| 7,051,786 B2 * | 5/2006 | Vuk | 165/41 |
| 7,089,994 B2 * | 8/2006 | Esposito et al. | 165/42 |
| 7,143,852 B2 * | 12/2006 | Yatsuda et al. | 180/69.2 |
| 7,143,856 B2 * | 12/2006 | Takahashi et al. | 180/274 |
| 7,204,329 B2 * | 4/2007 | Pfohl et al. | 180/68.3 |
| 7,261,173 B2 * | 8/2007 | Kurtz et al. | 180/69.2 |
| 7,370,718 B2 * | 5/2008 | Witwer et al. | 180/69.2 |
| 7,401,672 B2 * | 7/2008 | Kurtz et al. | 180/68.4 |
| 7,537,072 B2 * | 5/2009 | Sturmon et al. | 180/68.1 |
| 7,578,365 B2 * | 8/2009 | Kurtz et al. | 180/69.2 |
| 7,717,205 B2 * | 5/2010 | Kertz et al. | 180/68.3 |
| 7,753,152 B2 * | 7/2010 | Nakae et al. | 180/68.1 |
| 7,841,314 B2 * | 11/2010 | Nakashima et al. | 123/198 E |
| 7,856,811 B2 * | 12/2010 | Ell | 60/298 |
| 7,931,104 B2 * | 4/2011 | Frelich et al. | 180/68.1 |
| 8,006,991 B2 * | 8/2011 | Taniuchi et al. | 280/164.1 |
| 8,256,551 B2 * | 9/2012 | Entriken et al. | 180/68.1 |
| 8,453,776 B2 * | 6/2013 | Neilson | 180/68.1 |
| 8,505,661 B2 * | 8/2013 | Tsuji et al. | 180/68.4 |
| 8,556,013 B2 * | 10/2013 | Sturmon et al. | 180/68.1 |
| 2001/0007292 A1 * | 7/2001 | Yabf | 180/68.1 |
| 2002/0017408 A1 * | 2/2002 | Oshikawa et al. | 180/69.2 |
| 2003/0066209 A1 * | 4/2003 | Takezaki et al. | 37/197 |
| 2004/0200649 A1 * | 10/2004 | Yatsuda et al. | 180/69.2 |
| 2004/0216934 A1 * | 11/2004 | Tomiyama et al. | 180/68.1 |
| 2005/0211483 A1 * | 9/2005 | Pfohl et al. | 180/68.1 |
| 2005/0211487 A1 * | 9/2005 | Obe et al. | 180/69.21 |
| 2006/0016632 A1 * | 1/2006 | Samejima et al. | 180/68.1 |
| 2006/0201727 A1 * | 9/2006 | Chan | 180/69.25 |
| 2006/0213708 A1 * | 9/2006 | Witwer et al. | 180/68.1 |
| 2007/0007061 A1 * | 1/2007 | Meyer et al. | 180/68.1 |
| 2008/0121451 A1 * | 5/2008 | Kertz et al. | 180/69.24 |
| 2010/0301638 A1 * | 12/2010 | Hinshaw et al. | 296/208 |
| 2011/0011665 A1 * | 1/2011 | Peterson et al. | 180/309 |
| 2011/0180344 A1 * | 7/2011 | Kimura | 180/309 |
| 2012/0138379 A1 * | 6/2012 | Tsuji et al. | 180/309 |
| 2012/0186894 A1 * | 7/2012 | Schmidt et al. | 180/309 |
| 2012/0211293 A1 * | 8/2012 | Leanza et al. | 180/68.3 |
| 2012/0307863 A1 * | 12/2012 | Tada et al. | 374/144 |
| 2013/0000999 A1 * | 1/2013 | Naito et al. | 180/68.1 |
| 2013/0048396 A1 * | 2/2013 | Neilson | 180/68.1 |
| 2013/0074410 A1 * | 3/2013 | Berkeland | 49/142 |
| 2013/0146377 A1 * | 6/2013 | Adamson et al. | 180/68.1 |
| 2014/0020972 A1 * | 1/2014 | Masumoto et al. | 180/309 |

FOREIGN PATENT DOCUMENTS

| | | |
|---|---|---|
| JP | 2011-140853 A | 7/2011 |
| JP | 2012-214989 A | 11/2012 |
| WO | 2013/002390 A1 | 1/2013 |

OTHER PUBLICATIONS

International Search Report for PCT/JP2012/054464 issued on May 28, 2013.

* cited by examiner

ENGINE ROOM OF A WHEEL LOADER

CROSS-REFERENCE TO RELATED APPLICATIONS

This application is a U.S. National stage application of International Application No. PCT/JP2013/054464 filed on Feb. 22, 2013.

1. Field of the Invention

The present invention relates to a wheel loader and in particular to a wheel loader having an exhaust gas post-processing device above an engine.

2. Description of the Related Art

A wheel loader is equipped with an engine room accommodating an engine to the rear of a cab (Japanese Laid-Open Patent Publication No. H8-276755). Recently, exhaust gas post-processing devices have been mounted on wheel loaders for processing exhaust gas from the engine. The exhaust gas post-processing device includes mainly a diesel particulate filtering device, and is usually accommodated inside the engine room. A hydraulic excavator described in Japanese Laid-open Patent Publication No. 2011-140853 is provided with a nitrogen oxide purifying device as a selective catalyst reduction device as the exhaust gas post-processing device. These exhaust gas post-processing devices are typically disposed above the engine so as to be provided in the exhaust gas path.

SUMMARY

As described above, while the diesel particulate filter is used as the exhaust gas post-processing device, the provision of a selective catalyst reduction device in addition to the diesel particulate filtering device in the wheel loader is considered to further purify the exhaust gas. However, there is a problem in that the temperature inside the engine room rises excessively since these devices generate heat while operating. Problems such as the deterioration of a reducing agent such as urea water used in the selective catalyst reduction device occur when the temperature inside the engine room rises excessively.

An object of the present invention is to suppress an excessive rise in temperature inside the engine room.

(1) A wheel loader according to an aspect of the present invention includes an engine, an exhaust gas post-processing device, an engine room, a top plate, a cooling room, a partition wall, and a drainage mechanism. The exhaust gas post-processing device includes a diesel particulate filtering device and a nitrogen oxide reduction catalyst device, and is disposed above the engine. The engine room accommodates the engine and the exhaust gas post-processing device. The top plate includes a sloping part with a height that decreases toward the rear and a first ventilation part that includes a plurality of through-holes formed in the sloping part, and defines an upper plane of the engine room. The cooling room is disposed to the rear of the engine room and accommodates a cooling unit. The partition wall separates the engine room and the cooling room. The drainage mechanism is disposed below the first ventilation part, and receives water that enters the engine room from the first ventilation part and drains the water to the outside of the engine room.

However, the top plate that constitutes the engine room in a wheel loader equipped with an exhaust gas post-processing device is higher than the top plate in conventional vehicles since the diesel particulate filter and the selective catalyst reduction device are disposed above the engine. The visibility to the rear is undesirably reduced when the top plate of the engine room is high.

Accordingly, since the rear part of the top plate of the engine room is mainly provided with a sloping part in which the height is reduced toward the rear in the abovementioned wheel loader, the visibility to the rear can be assured even though the top plate of the engine room is high. The present invention also includes a ventilation part in the sloping part to suppress an excessive rise in temperature inside the engine room. Specifically, the temperature rises excessively inside the engine room that accommodates the diesel particulate filtering device and the selective catalyst reduction device since these devices generate heat while operating thus producing hot air. Accordingly, since sloping part of the top plate that defines the upper plane of the engine room in the abovementioned wheel loader has a first ventilation part that includes a plurality of through-holes, the hot air is exhausted to the outside through the first ventilation part. As a result, an excessive rise in the temperature inside the engine room can be suppressed. Since the diesel particulate filtering device and the selective catalyst reduction device that are the source of the heat are disposed above the engine and located in a position near the first ventilation part, the hot air produced by the devices is effectively exhausted to the outside. Since the engine room and the cooling room are separated by the partition wall, the hot air inside the engine room can be prevented from flowing into the cooling room.

There is a risk that rain could enter the engine room through the first ventilation part since the first ventilation part is formed in the top plate. Accordingly, the first ventilation part is formed in the sloping part in the abovementioned wheel loader. By forming the first ventilation part in the sloping part, the intrusion of rain into the engine room can be suppressed since the surface area in a planar view can be reduced in size in comparison to a case in which a ventilation part with the same surface area is formed in a horizontal portion. Further, since the drainage mechanism is disposed below the first ventilation part, water can be drained by the drainage mechanism even if water due to rain and the like enters the engine room from the first ventilation part. As a result, damage to belts and the like caused by water entering the engine room and adhering to, for example, the belts for transmitting torque from the engine to auxiliary equipment and then freezing can be prevented.

(2) The drainage mechanism may have a receptacle member and a water conveyance member. The receptacle member is disposed below the first ventilation part and receives water that enters the engine room from the first ventilation part. The water conveyance member guides the water collected in the receptacle member to the outside of the engine room.

(3) The partition wall may have a water drainage outlet, and the receptacle member may have a bottom plate having a through-hole, and side plates extending upward from the outer circumference edge part of the bottom plate. The water conveyance member may be disposed below the through-hole of the bottom plate, and may guide the water that drips down from the through-hole in the bottom plate through the water drainage outlet of the partition wall into the cooling room.

According to this configuration, the receptacle member collects water temporarily and the collected water drips down through the through-hole into the water conveyance member. The water conveyance member is able to drain the water from the receptacle member through the water drainage outlet of the partition wall toward the cooling room. The cooling room generally does not accommodate any device that suffers from problems due to water intrusion.

(4) Preferably, the receptacle member has heat insulation properties and is disposed above the diesel particulate filtering device. For example, the receptacle member is formed from a steel plate that is treated with a heat resistant coating, or the receptacle member contains at least one selected from the group consisting of aluminum, an aluminum alloy, and stainless steel.

According to this configuration, since the receptacle member that is interposed between the diesel particulate filtering device and the top plate has heat insulating properties, damage to the coating of the top plate due to radiant heat from the diesel particulate filtering device can be prevented.

(5) Preferably, the sloping part of the top plate defines a rear part upper plane of the engine room. The top plate has a flat part that extends horizontally from the front edge of the sloping part toward the front and defines a front part upper plane of the engine room. According to this configuration, the capacity of the engine room is increased by the amount in which the flat part projects upward.

(6) Preferably, the top plate further includes a pair of side wall parts that extend downward from both side edges of the flat part and the sloping part. The side wall parts include a second ventilation part having a plurality of through-holes.

According to this configuration, since the top plate has a second ventilation part in addition to the first ventilation part, air is able to flow more smoothly between the inside and the outside of the engine room. As a result, an excessive rise in the temperature inside the engine room can be suppressed more effectively.

(7) Preferably, the through-holes of the second ventilation part have eave parts. According to this configuration, rainwater and the like can be prevented from entering the engine room through the second ventilation part.

According to the present invention, an excessive rise in temperature inside the engine room can be suppressed.

DESCRIPTION OF EMBODIMENTS

Figure 1:
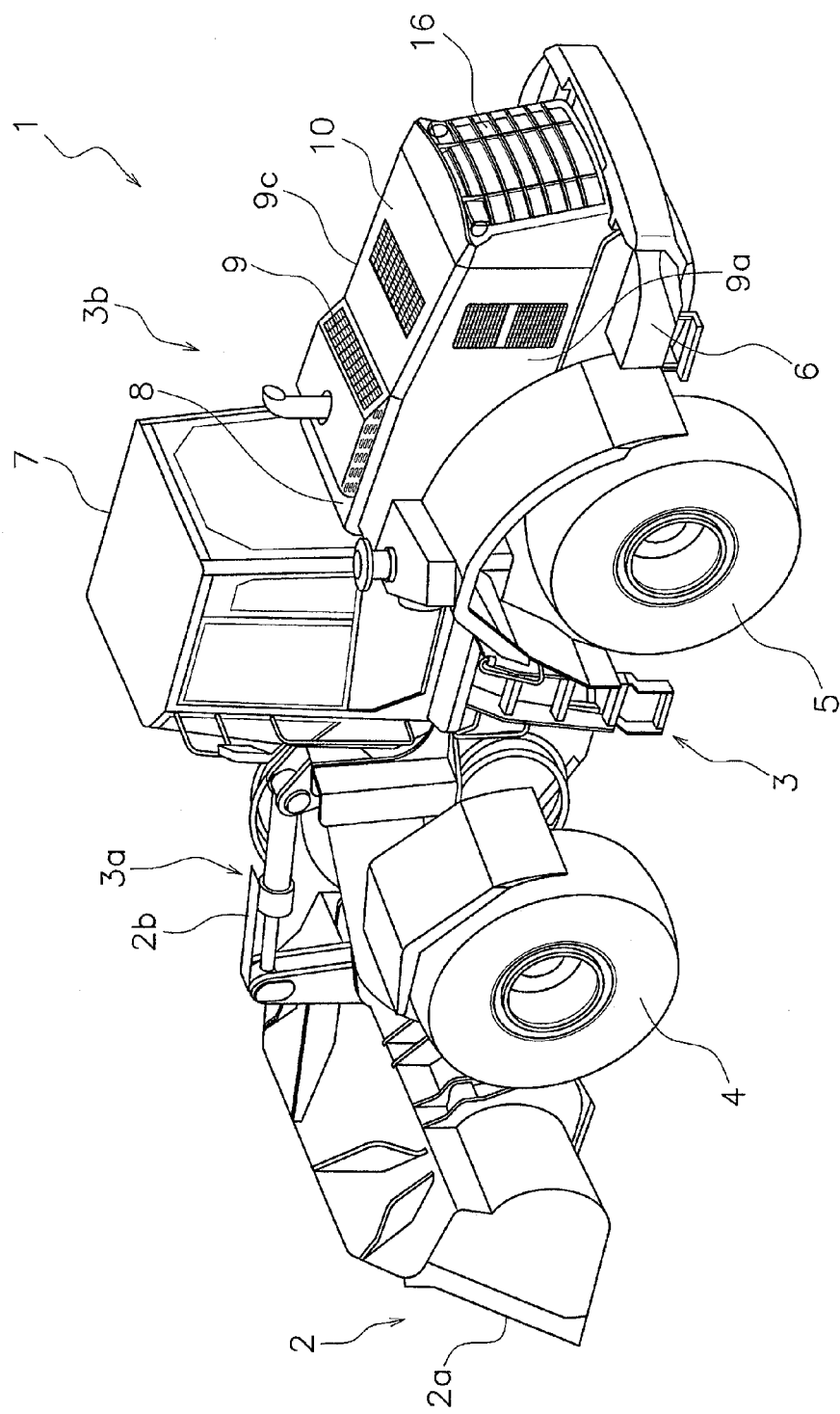
FIG. 1 is a perspective view of the wheel loader as seen from the left rear.

An embodiment of a wheel loader according to the present invention will be explained below with reference to the drawings. FIG. 1 is a perspective external view of a wheel loader 1 as seen from the left rear. In the following description, "right," "left," "up," and "down" indicate directions relative to a state of looking forward from the operating cabin, and "vehicle width direction" and "crosswise direction" have the same meaning. Further, "width" signifies a length in the crosswise direction.

As illustrated in FIG. 1, the wheel loader 1 includes working equipment 2, a vehicle frame 3, front wheels 4, and rear wheels 5. The wheel loader 1 is capable of traveling due to the rotation of the front wheels 4 and the rear wheels 5, and desired work can be conducted using the working equipment 2.

The working equipment 2 is a mechanism driven by operating fluid pressurized by a pump, and is disposed at the front of the vehicle frame 3. The working equipment 2 includes a bucket 2a, a boom (not shown), a lift cylinder (not shown), and a bucket cylinder 2b. The bucket 2a is attached to the tip of the boom. The boom is a member for lifting the bucket 2a and is mounted at the front part of a belowmentioned front vehicle frame 3a. The lift cylinder drives the boom with pressure oil discharged from a working equipment pump. The bucket cylinder 2b drives the bucket 2a with pressure oil discharged from the working equipment pump.

The vehicle frame 3 includes the front vehicle frame 3a and a rear vehicle frame 3b. The front vehicle frame 3a and the rear vehicle frame 3b are coupled to each other in a manner that allows swinging in the crosswise direction. The working equipment 2 and the front wheels 4 are provided on the front vehicle frame 3a, and the rear wheels 5 are provided on the rear vehicle frame 3b.

The rear vehicle frame 3b includes a rear frame 6, a cab 7, an operating fluid tank 8, an engine room 9, a cooling room 10, and a cooling fan 11. The rear frame 6 is a frame that constitutes a bottom part of the rear vehicle frame 3b, and supports the rear wheels 5, the cab 7, the operating fluid tank 8, an engine 12, and a cooling unit 17.

An operating cabin is provided inside the cab 7, and various operating members and an operating panel are provided inside the cab 7. The operating fluid tank 8 is disposed to the rear of the cab 7, and a plurality of hydraulic pumps (not shown) are disposed below the operating fluid tank 8. Operating fluid for driving the working equipment 2 and the like is accumulated in the operating fluid tank 8, and the operating fluid is supplied to the working equipment 2 and the like by the hydraulic pumps.

Figure 2:
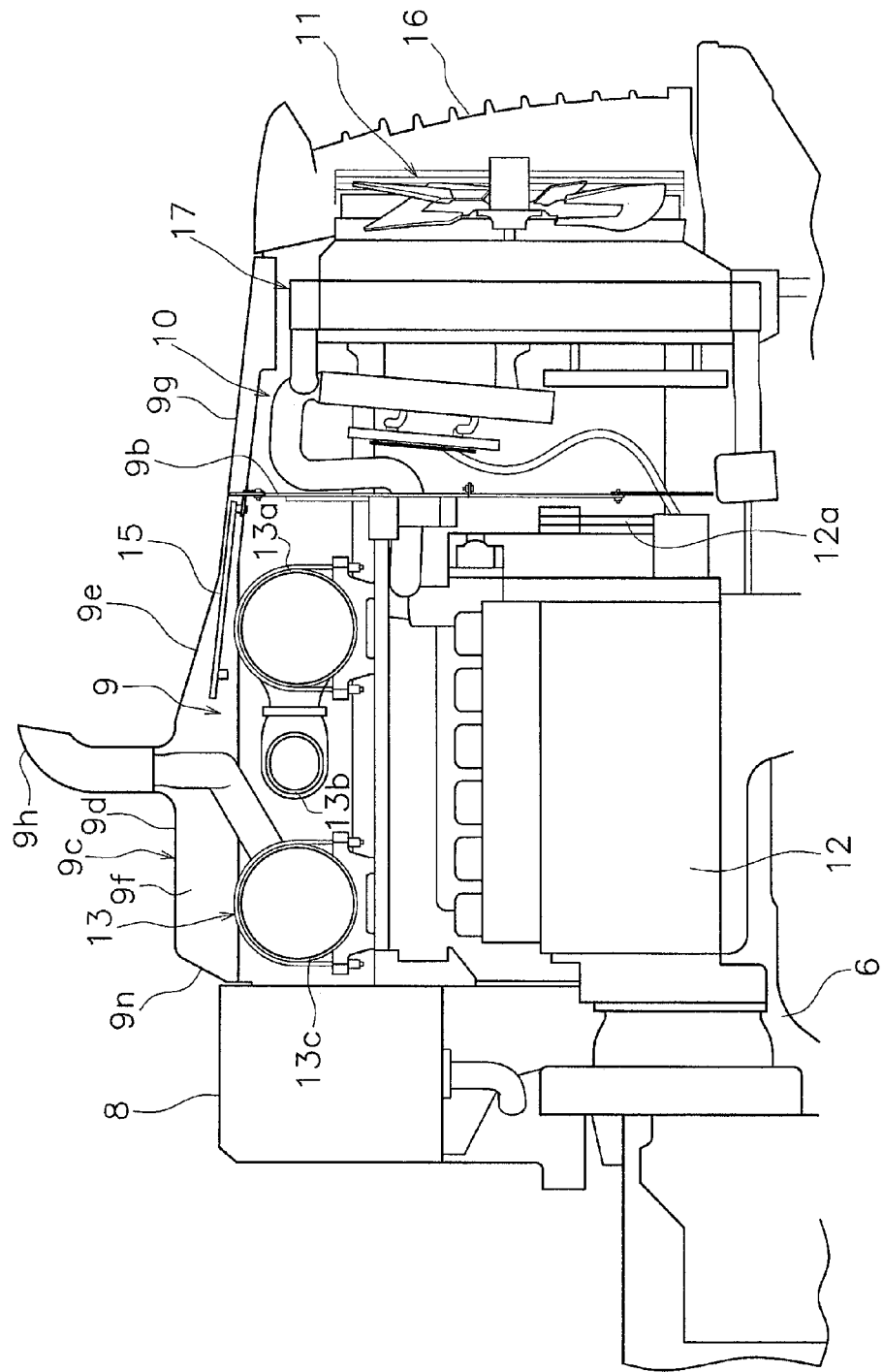
FIG. 2 is a side cross-section of the rear vehicle frame as seen from the left side.

FIG. 2 is a side cross-section of the rear vehicle frame 3b as seen from the left side. As illustrated in FIG. 2, the engine room 9 is disposed to the rear of the operating fluid tank 8, and has a lower plane defined by the rear frame 6, side planes defined by a vehicle cover 9a (see FIG. 1), and a rear plane defined by a partition wall 9b. The vehicle cover 9a opens upward and an upper plane of the vehicle cover 9a is covered by a top plate 9c. Specifically, the upper plane of the engine room 9 is defined by the top plate 9c.

The engine room 9 accommodates the engine 12, an exhaust gas post-processing device 13, and the like. The engine room 9 further accommodates a belt 12a and the like for transmitting torque from the engine 12 to auxiliary equipment. The engine 12 is disposed in a lower part of the engine room 9 and is an engine in which the crankshaft extends in the front-back direction, that is, a so-called vertical mounted engine.

Figure 3:
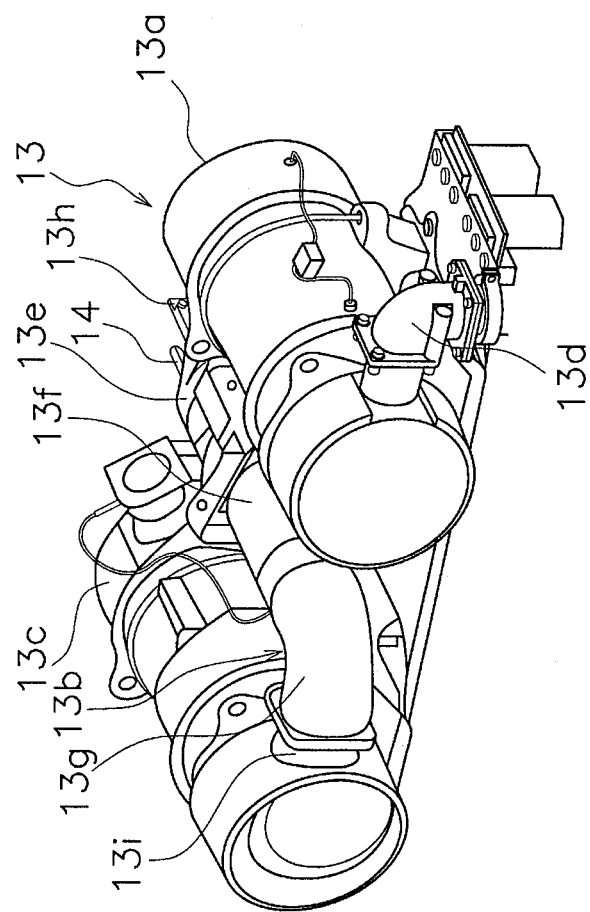
FIG. 3 is a perspective view of the exhaust gas post-processing device as seen from the left rear.

The exhaust gas post-processing device 13 accommodated in the engine room 9 is disposed in an upper part of the engine room 9. Specifically, the exhaust gas post-processing device 13 is disposed above the engine 12. FIG. 3 is a perspective view of the exhaust gas post-processing device 13 as seen from the left rear. As illustrated in FIG. 3, the exhaust gas post-processing device 13 includes, in order of the flow of exhaust gas, a diesel particulate filtering device 13a, a connecting pipe 13b, and a selective catalyst reduction device 13c. A urea water injection device 14 is attached to the connecting pipe 13b.

The diesel particulate filtering device 13a is coupled to the engine 12 via a pipe 13d, and treats exhaust gas exhausted from the engine 12. Specifically, the diesel particulate filtering device 13a is a device that collects, in a filter, particulate matter such as soot in the exhaust gas exhausted from the engine 12. The diesel particulate filtering device 13a burns the collected particulate matter with a heater provided with the filter. The diesel particulate filtering device 13a is mounted on a supporting member and the like attached to the rear frame 6.

The connecting pipe 13b connects the diesel particulate filtering device 13a and the selective catalyst reduction device 13c. The connecting pipe 13b has a first bend section 13e, a linear section 13f, and a second bend section 13g, and the entire connecting pipe 13b forms an S shape. The first bend section 13e is connected to an exhaust gas outlet 13h of the diesel particulate filtering device 13a, and the second bend section 13g is connected to an exhaust gas inlet 13i of the selective catalyst reduction device 13c. The linear section 13f extends between the first bend section 13e and the second bend section 13g.

The urea water injection device 14 is attached to the first bend section 13e. The urea water injection device 14 sucks up a urea aqueous solution from a urea aqueous solution tank (not shown) via a pump (not shown), and ejects the urea aqueous solution into the connecting pipe 13b in order to mix the urea aqueous solution into the exhaust gas as a reducing agent. The mixed urea aqueous solution is hydrolyzed to become ammonia, and the ammonia is fed with the exhaust gas through the connecting pipe 13b to the selective catalyst reduction device 13c.

The ammonia from the urea water injection device 14 is used as the reducing agent to purify by reduction the nitrogen oxides in the exhaust gas in the selective catalyst reduction device 13c. The selective catalyst reduction device 13c is mounted on a supporting member and the like in the same way as the diesel particulate filtering device 13a.

The diesel particulate filtering device 13a and the selective catalyst reduction device 13c are disposed parallel to each other. Specifically, the diesel particulate filtering device 13a and the selective catalyst reduction device 13c are both substantially cylindrical and the center axes thereof are disposed so as to extend in the crosswise direction and are substantially parallel to each other. The linear section 13f in the connecting pipe 13b is also substantially cylindrical and the center axis thereof extends in the crosswise direction. Specifically, the center axis of the linear section 13f in the connecting pipe 13b is substantially parallel to the center axes of the diesel particulate filtering device 13a and the selective catalyst reduction device 13c.

As illustrated in FIG. 2, the cooling room 10 is disposed to the rear of the engine room 9, and the cooling unit 17 is accommodated inside the cooling room 10. The cooling unit 17 is a unit for reducing the temperature of liquids or gases flowing inside the cooling unit, and may be exemplified by a condenser or a radiator and the like. The cooling room 10 has a lower plane defined by the rear frame 6, a front plane defined by the partition wall 9b, side planes defined by the vehicle cover 9a, and a rear plane defined by a grille 16. The upper plane of the cooling room 10 is covered by the top plate 9c in the same way as the engine room 9. Specifically, the upper plane of the cooling room 10 is defined by the top plate 9c. Air inside the cooling room 10 is exhausted to the outside through an opening part in the grille 16 when the cooling fan 11 is rotated.

Figure 4:
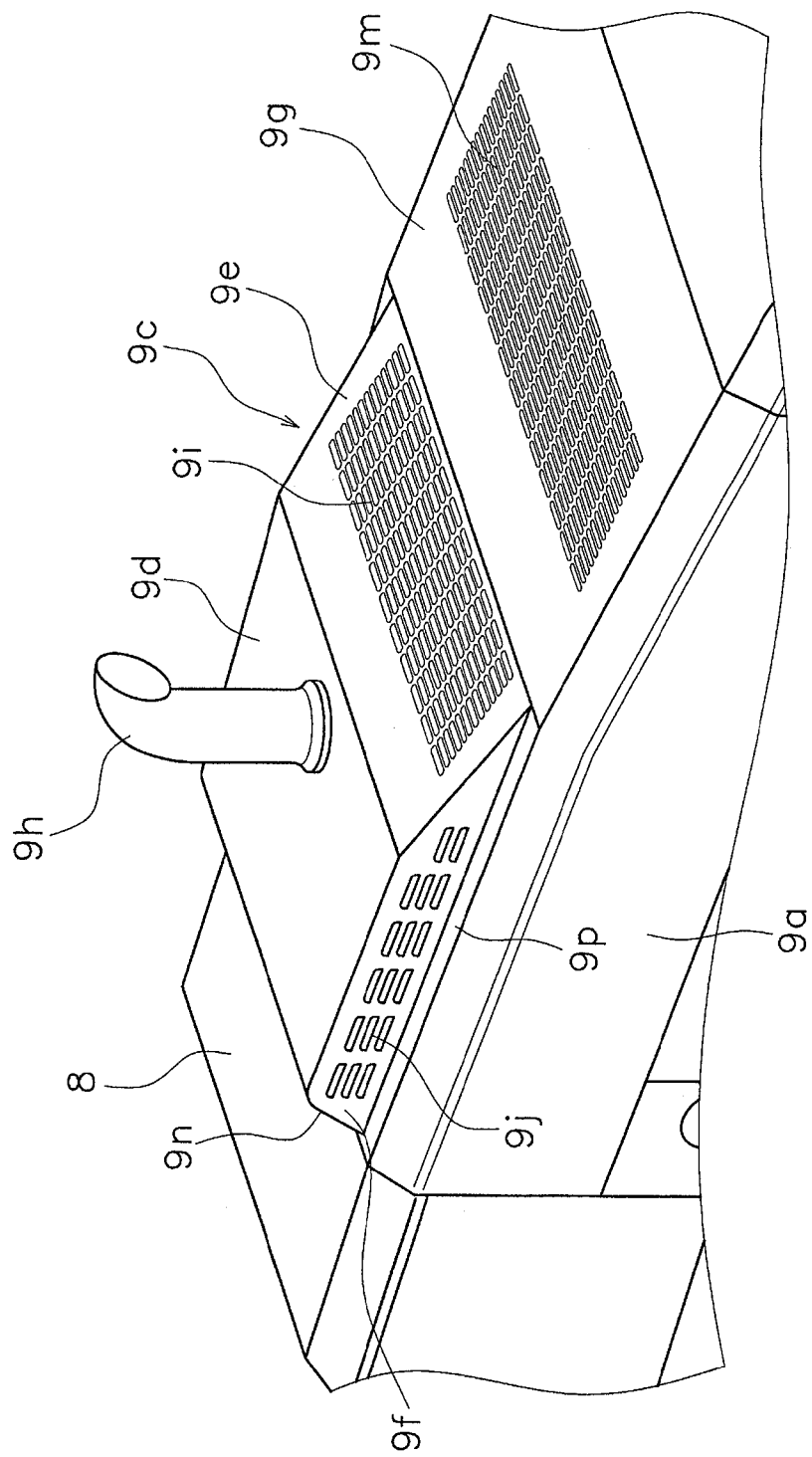
FIG. 4 is a perspective view of the top plate as seen from the left rear.

FIG. 4 is a perspective view of the top plate 9c as seen from the left rear. As illustrated in FIG. 4, the top plate 9c is fixed in a removable manner with screws and the like to the upper end part of the vehicle cover 9a. The top plate 9c is a plate-like member having a front part that projects upward, and includes a flat part 9d, a first sloping part 9c (example of sloping part), a pair of side wall parts 9f, a front wall part 9n (see FIG. 2), and a second sloping part 9g.

The flat part 9d is rectangular, extends substantially horizontally, and defines the front part upper plane of the engine room 9. An exhaust pipe 9h extends upward from the flat part 9d. The exhaust pipe 9h is a pipe for exhausting the exhaust gas that has been processed from the exhaust gas post-processing device 13 to the outside. As illustrated in FIG. 2, the front wall part 9n extends from the front edge of the flat part 9d downward toward the vehicle cover 9a.

As illustrated in FIG. 4, the first sloping part 9e extends to the rear from the rear edge of the flat part 9d, and the height decreases towards the rear. The first sloping part 9e has the same width as the flat part 9d and defines the rear part upper plane of the engine room 9. The first sloping part 9e has a first ventilation part 9i made up of a plurality of through-holes. Air inside the engine room 9 is exhausted to the outside, and outside air is sucked into the engine room 9 through the first ventilation part 9i. The through-holes that constitute the first ventilation part 9i are shaped as slits.

The pair of side wall parts 9f extends downward from both edges of the flat part 9d and the first sloping part 9e toward the vehicle cover 9a. The side wall parts 9f each have a flange part 9p at the lower edges. The side wall parts 9f each have a second ventilation part 9j made up of a plurality of through-holes. Air inside the engine room 9 is exhausted to the outside, and outside air is sucked into the engine room 9 through the second ventilation parts 9j. The through-holes that constitute the second ventilation parts 9j are shaped as slits.

Figure 5:
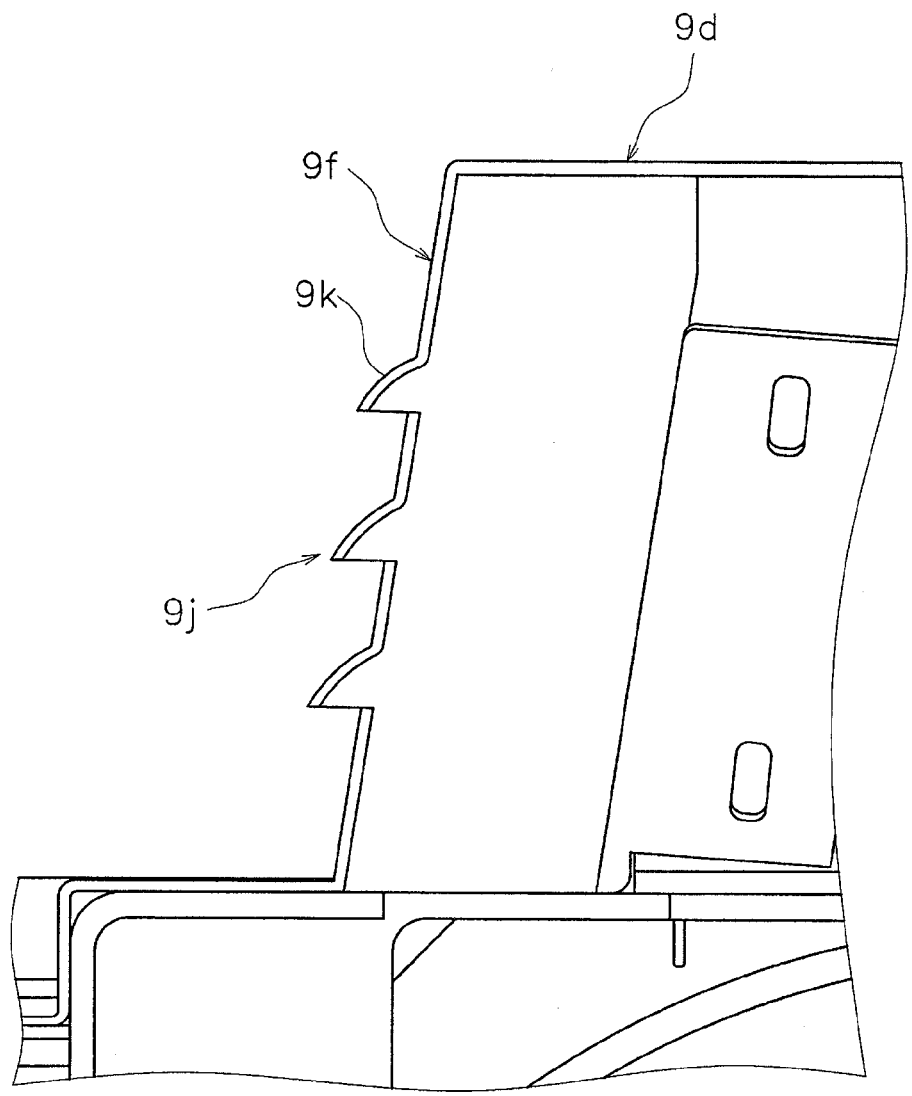
FIG. 5 is a cross-section of the left side of the top plate as seen from the rear.

FIG. 5 is a cross-section of the left side of the side wall part 9f as seen from the rear. As illustrated in FIG. 5, the through-holes that constitute the second ventilation parts 9j each have an eave part 9k at the upper part. By providing each of the through-holes with the eave part 9k at the upper part since the side wall parts 9f substantially extend vertically, liquid such as rainwater can be prevented from entering the engine room 9.

As illustrated in FIG. 4, a projecting part at the front of the top plate 9c is configured by the abovementioned flat part 9d, the first sloping part 9e, the pair of side wall parts 9f, and the front wall part 9n. The capacity of the engine room 9 is increased by the amount of the space enclosed by the flat part 9d, the first sloping part 9e, the pair of side wall parts 9f and the front wall part 9n.

The second sloping part 9g extends to the rear from the rear edges of the first sloping part 9e and the flange parts 9p. The height of the vehicle cover 9a decreases toward the rear, and the second sloping part 9g slopes along the upper edge of the rear part of the vehicle cover 9a. Specifically, the height of the second sloping part 9g decreases toward the rear. The slope of the second sloping part 9g is gentler than the slope of the first sloping part 9e.

The second sloping part 9g mainly defines an upper plane of the cooling room 10, and partially defines the rear part upper plane of the engine room 9. The second sloping part 9g has a ventilation part 9m made up of a plurality of through-holes. When the cooling fan 11 is operating, air inside the cooling room 10 is exhausted to the outside via the cooling fan 11, and outside air is sucked into the cooling room 10 through the ventilation part 9m.

Figure 6:
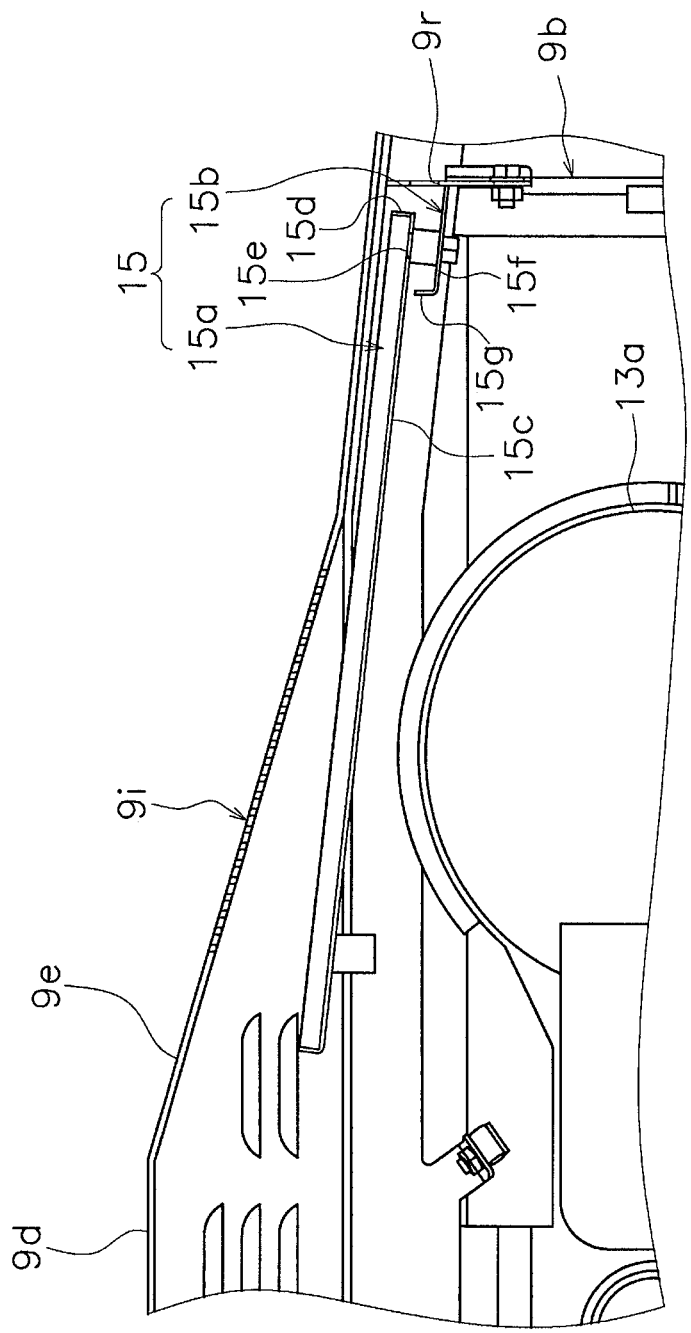
FIG. 6 is a side cross-section of the drainage mechanism as seen from the left side.

FIG. 6 is a side cross-section of a drainage mechanism 15 disposed inside the rear vehicle frame 3b as seen from the left side. As illustrated in FIG. 6, the drainage mechanism 15 is disposed inside the engine room 9. The drainage mechanism 15 includes a receptacle member 15a and a water conveyance member 15b.

The receptacle member 15a is disposed below the first ventilation part 9i of the first sloping part 9e, and is a tray-like member adapted to receive rainwater and the like that enters the engine room 9 from the first ventilation part 9i. The receptacle member 15a has a rectangular bottom plate 15c and side plates 15d that extend upward from the outer edges of the bottom plate 15c. The width of the receptacle member 15a is the same or greater than the width of the first ventilation part 9i so as to be able to receive all the rainwater entering through the first ventilation part 9i, and is preferably approximately the same width as the engine room 9. The front edge of the receptacle member 15a is located at the front edge of the first ventilation part 9i or located further forward than the front edge of the first ventilation part 9i. The rear edge of the receptacle member 15a is located at the rear edge of the first ventilation part 9i or further to the rear of the rear edge of the first ventilation part 9i and is preferably located near the partition wall 9b. The bottom plate 15c is disposed in a sloping manner so that the height of the bottom plate 15c is lower further toward the rear in order to allow the rainwater received by the receptacle member 15a to flow to the rear.

Figure 7:
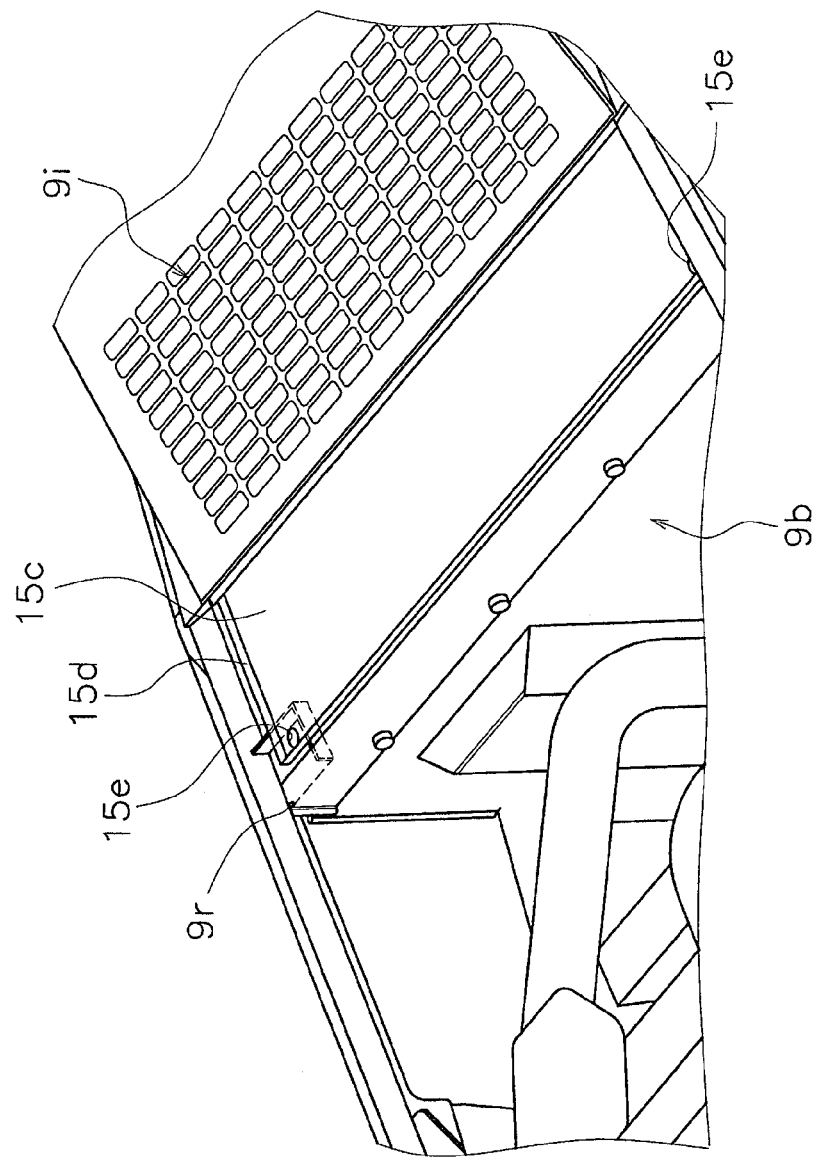
FIG. 7 is a perspective view of the drainage mechanism as seen from the right rear.
Figure 8:
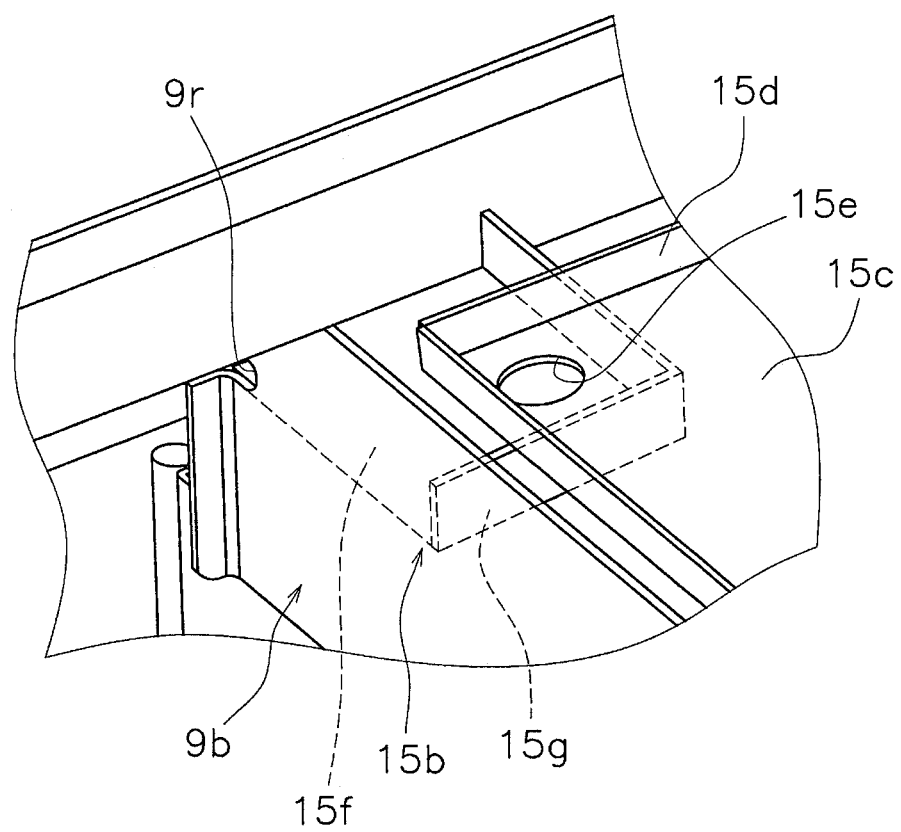
FIG. 8 is a perspective view of the water conveyance member disposed on the left side as seen from the right rear.

FIG. 7 is a perspective view of the drainage mechanism 15 as seen from the right rear, and FIG. 8 is a perspective view of the water conveyance member 15b disposed on the left side as seen from the right rear. In order to facilitate explanation, the second sloping part 9g of the top plate 9c is omitted in FIG. 7 and FIG. 8. As illustrated in FIG. 7, the bottom plate 15c of the receptacle member 15a has through-holes 15e at a left rear edge part and at a right rear edge part. The water conveyance members 15b are disposed below each of the through-holes 15e. The water conveyance member 15b disposed on the left side of the engine room 9 and the water conveyance member 15b disposed on the right side of the engine room 9 have symmetrical shapes relative to the center in the vehicle width direction, and therefore only an explanation of the water conveyance member 15b disposed on the left side will be provided hereinbelow.

The water conveyance member 15b is a member that guides rainwater that drips off from the through-holes 15e of the receptacle member 15a to the outside of the engine room 9. As illustrated in FIGS. 6 and 8, the water conveyance member 15b has a bottom plate 15f and side plates 15g. The bottom plate 15f is rectangular, and the left edge of the bottom plate 15f is fitted to the vehicle cover 9a, and the rear edge of the bottom plate 15g is fitted to the partition wall 9b. The side plates 15g extend upward from the front edge and the right edge of the bottom plate 15f. Specifically, the water conveyance member 15b is a vessel-shaped member that is open at the upper plane, and the lower plane is defined by the bottom plate 15f and the side planes are defined by the side plates 15f, the vehicle cover 9a, and the partition wall 9b.

The partition wall 9b is a plate-like member for separating the engine room 9 and the cooling room 10, and has notch-like water drainage outlets 9r at a right upper edge part and at a left upper edge part. The upper edge of each water drainage outlet 9r is located higher than the bottom plate 15f of the water conveyance member 15b, and the bottom edge of each water drainage outlet 9r is located lower than the upper edge of the side plates 15g. The water conveyance member 15b is disposed in a sloping manner so that the height of the bottom plate 15f is lower further toward the rear in order to allow the rainwater received by the receptacle member 15a to flow to the rear. As a result, the rainwater that drips off of the receptacle member 15a into the water conveyance members 15b flows to the rear and is drained through the water drainage outlets 9r of the partition wall 9b toward the cooling room 10.

The receptacle member 15a is located below the first sloping part 9e as illustrated in FIG. 2. The receptacle member 15a is located above the diesel particulate filtering device 13a. The receptacle member 15a has heat insulation properties. For example, the receptacle member 15a may be formed of a steel plate treated with a heat insulating coating, may be formed of aluminum, an aluminum alloy, or stainless steel, or may be coated with a coating including aluminum, an aluminum alloy, or stainless steel. The transmission of radiant heat from the diesel particulate filtering device 13a to the top plate 9c can be suppressed by the receptacle member 15a that is disposed between the diesel particulate filtering device 13a and the top plate 9c. In this way, the receptacle member 15a functions as a heat insulating plate.

Characteristics

The wheel loader 1 according to the present embodiment has the following characteristics.

(1) Since mainly the rear part of the top plate 9c of the engine room 9 is provided with a first sloping part 9e in which the height is reduced toward the rear in the wheel loader 1, the visibility to the rear can be assured even though the top plate 9c of the engine room 9 is high. The wheel loader 1 further has the first ventilation part 9i in the first sloping part 9e of the top plate 9c that defines the upper plane of the engine room 9. As a result, heat generated by the diesel particulate filtering device 13a and the selective catalyst reduction device 13c is exhausted from the engine room 9 to the outside through the first ventilation part 9i. As a result, an excessive rise in the temperature inside the engine room 9 can be suppressed. Since the diesel particulate filtering device 13a and the selective catalyst reduction device 13c that are the source of the heat are disposed above the engine 12 and located in a position near the first ventilation part 9i, the hot air produced by the devices is effectively exhausted to the outside. Since the engine room 9 and the cooling room 10 are separated by the partition wall 9b, the hot air inside the engine room 9 can be prevented from flowing into the cooling room 10.

(2) By forming the first ventilation part 9i in the first sloping part 9i, the intrusion of rainwater into the engine room can be suppressed since the surface area in a planar view is reduced in size in comparison to a case in which the first ventilation part 9i having the same surface area is formed in the flat part 9d that is a horizontal portion. Further, since the drainage mechanism 15 is disposed below the first ventilation part 9i, water can be drained by the drainage mechanism 15 even if rain water enters the engine room 9 from the first ventilation part 9i. As a result, damage to belts and the like caused, for example, by water entering the engine room 9 and adhering to the belts and then freezing, can be prevented.

(3) Damage to the coating of the top plate 9c due to radiant heat from the diesel particulate filtering device 13a can be suppressed since the receptacle member 15a that is disposed between the diesel particulate filtering device 13a and the top plate 9c has heat insulating properties.

(4) The capacity of the engine room 9 is increased by the amount in which the front part of the top plate 9c projects upward.

(5) Since the top plate 9c has a second ventilation part 9j in addition to the first ventilation part 9i, air is able to flow more smoothly between the inside and the outside of the engine room 9. As a result, an excessive rise in the temperature inside the engine room 9 can be suppressed more effectively.

(6) Since the second ventilation part 9j has the eave parts 9k, the intrusion of rainwater through the second ventilation part 9j into the engine room 9 can be suppressed.

MODIFIED EXAMPLES

While an embodiment of the present invention has been described above, the present invention is not limited to the embodiment and the following modifications may be made within the scope of the present invention.

Modified Example 1

The number of water conveyance members 15b is not limited to two, and one or three or more may be provided. The receptacle member 15a has the same number of through-holes 15e as the number of water conveyance members 15b. If only one water conveyance member 15b is provided, then the receptacle member 15a has only one through-hole 15e and the water conveyance member 15b is provided under the through-hole 15e. The location of the through-hole 15e of the receptacle member 15a is preferably at the left rear edge part or the right rear edge part of the bottom plate 15c. This is because the rainwater collected on the receptacle member 15a gathers easily at the left rear edge part or the right rear edge part.

Modified Example 2

Figure 9:
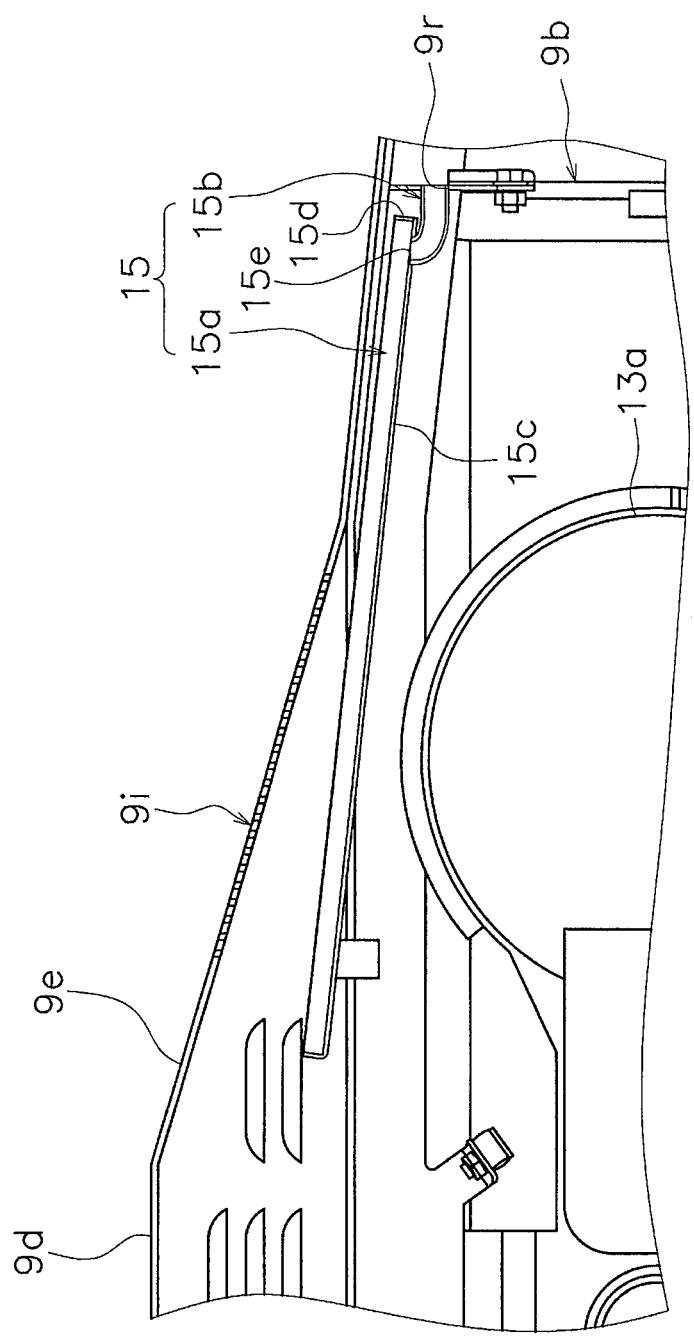
FIG. 9 is a side cross-section of a drainage mechanism according to a second modified example as seen from the left side.

As illustrated in FIG. 9, the water conveyance member 15b may have a pipe-like member. A first edge part of the water conveyance member 15b is linked to the through-hole 15e of the receptacle member 15a, and a second edge part is linked to the water drainage outlet of the partition wall 9b. The water conveyance member 15b may pass through the water drainage outlet 9r of the partition wall 9b so that the second edge part is located in the cooling room 10.

Modified Example 3

While the drainage mechanism 15 is constituted by the receptacle member 15a and the water conveyance member 15b as separate members in the above embodiment and the modified example 2, the receptacle member 15a and the water conveyance member 15b may be formed in an integrated manner.

Modified Example 4

While the water drainage outlet 9r of the partition wall 9b has a notch shape in the above embodiment, the water drainage outlet 9r is not limited to this shape and may be a through-hole formed in the partition wall 9b.

The invention claimed is:

1. A wheel loader comprising:
an engine;
an exhaust gas post-processing device disposed above the engine, and including a diesel particulate filtering device and a selective catalyst reduction catalyst device;
an engine room for accommodating the engine and the exhaust gas post-processing device;
a top plate having a sloping part with a height that decreases toward a rear of the engine room, and a first ventilation part that includes a plurality of through-holes formed in the sloping part, the top plate defining an upper plane of the engine room;
a cooling room disposed rearwardly of the engine room and accommodating a cooling unit;
a partition wall that separates the engine room and the cooling room, an entirety of the partition wall extending between the engine and the cooling unit in a widthwise direction of the wheel loader; and
a drainage mechanism that is disposed below the first ventilation part, and adapted to receive water that enters the engine room from the first ventilation part and drain the water to the outside of the engine room.

2. The wheel loader according to claim 1, wherein
the drainage mechanism includes
a receptacle member that is disposed below the first ventilation part, and adapted to receive water that enters the engine room from the first ventilation part, and
a water conveyance member adapted to guide the water collected in the receptacle member to the outside of the engine room.

3. The wheel loader according to claim 2, wherein
the partition wall includes a water drainage outlet,
the receptacle member includes a bottom plate having a through-hole, and side plates extending upward from an outer circumference edge part of the bottom plate, and
the water conveyance member is disposed below the through-hole of the bottom plat; and adapted to guide water that drips down from the through-hole of the bottom plate through the water drainage outlet of the partition wall into the cooling room.

4. The wheel loader according to claim 2, wherein
the receptacle member has heat insulating properties and is disposed above the diesel particulate filtering device.

5. The wheel loader according to claim 4, wherein
the receptacle member is formed from a steel plate that is treated with a heat resistant coating.

6. The wheel loader according to claim 4, wherein
the receptacle member contains at least one selected from the group consisting of aluminum, an aluminum alloy, and stainless steel.

7. The wheel loader according to claim 1, wherein
the sloping part of the top plate defines a rear part upper plane of the engine room; and
the top plate further includes a flat part that extends horizontally frontward from a front edge of the sloping part, and that defines a front part upper plane of the engine room.

8. The wheel loader according to claim 7, wherein
the top plate further includes a pair of side wall parts that extend downward from both side edges of the flat part and the sloping part; and
the side wall parts include a second ventilation part having a plurality of through-holes.

9. The wheel loader according to claim 8, wherein
the through-holes of the second ventilation part each have an eave part.

10. The wheel loader according to claim 1, wherein
the partition wall is substantially planar.

11. A wheel loader comprising:
an engine;
an exhaust gas post-processing device disposed above the engine, and including a diesel particulate filtering device and a selective catalyst reduction catalyst device;

an engine room for accommodating the engine and the exhaust gas post-processing device;

a top plate having a sloping part with a height that decreases toward a rear of the engine room, and a first ventilation part that includes a plurality of through-holes formed in the sloping part, the top plate defining an upper plane of the engine room;

a cooling room disposed rearwardly of the engine room and accommodating a cooling unit;

a partition wall that separates the engine room and the cooling room; and a drainage mechanism that is disposed below the first ventilation part, and adapted to receive water that enters the engine room from the first ventilation part and drain the water to the outside of the engine room, the drainage mechanism including
- a receptacle member disposed below the first ventilation part, and adapted to receive water that enters the engine room from the first ventilation part, and
- a water conveyance member adapted to guide the water collected in the receptacle member to the outside of the engine room;

the partition wall including a water drainage outlet, the receptacle member including a bottom plate having a through-hole, and side plates extending upward from an outer circumference edge part of the bottom plate, and the water conveyance member being disposed below the through-hole of the bottom plate, and adapted to guide water that drips down from the through-hole of the bottom plate through the water drainage outlet of the partition wall into the cooling room.

* * * * *